(12) United States Patent
Wu

(10) Patent No.: US 9,895,940 B2
(45) Date of Patent: Feb. 20, 2018

(54) WHEEL

(71) Applicant: ScienBiziP Consulting (Shen Zhen) Co., Ltd., Shenzhen (CN)

(72) Inventor: Wei-Feng Wu, Shenzhen (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 239 days.

(21) Appl. No.: 14/680,494

(22) Filed: Apr. 7, 2015

(65) Prior Publication Data

US 2016/0023522 A1    Jan. 28, 2016

(30) Foreign Application Priority Data

Jul. 25, 2014  (CN) .......................... 2014 1 0357658

(51) Int. Cl.
*B60C 17/00* (2006.01)
*B60C 17/04* (2006.01)
*B60C 17/06* (2006.01)

(52) U.S. Cl.
CPC .......... *B60C 17/047* (2013.01); *B60C 17/009* (2013.01); *B60C 17/0018* (2013.01); *B60C 17/0045* (2013.01); *B60C 17/06* (2013.01)

(58) Field of Classification Search
CPC .......... B60C 17/00; B60C 17/04; B60C 17/06
See application file for complete search history.

(56) References Cited

U.S. PATENT DOCUMENTS 6,923,233 B1    8/2005   Girault et al.

FOREIGN PATENT DOCUMENTS

| GB | 867103 | * | 5/1961 |
| JP | 2001-1726 | * | 1/2001 |
| WO | 94/25297 A1 | | 11/1994 |

* cited by examiner

*Primary Examiner* — Justin R Fischer
(74) *Attorney, Agent, or Firm* — ScienBiziP, P.C.

(57) ABSTRACT

The wheel includes a tire, a rim, two groups of supporting members. The tire is coupled to the rim. The groups of supporting members are oppositely positioned and received in the tire. Each group of supporting members are separately positioned from each other. The supporting members of each group are coupled to an inner surface of the tire by injection method. Central axes of the supporting members of each group are coincident or parallel. A central axis of each supporting member is coincident with or parallel to a central axis of a central axis of the tire.

11 Claims, 5 Drawing Sheets

WHEEL

FIELD

The present disclosure relates to wheels, particularly to a vehicle wheel.

BACKGROUND

Vehicles are widely used. It is dangerous when the vehicle gets a flat tire during driving.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
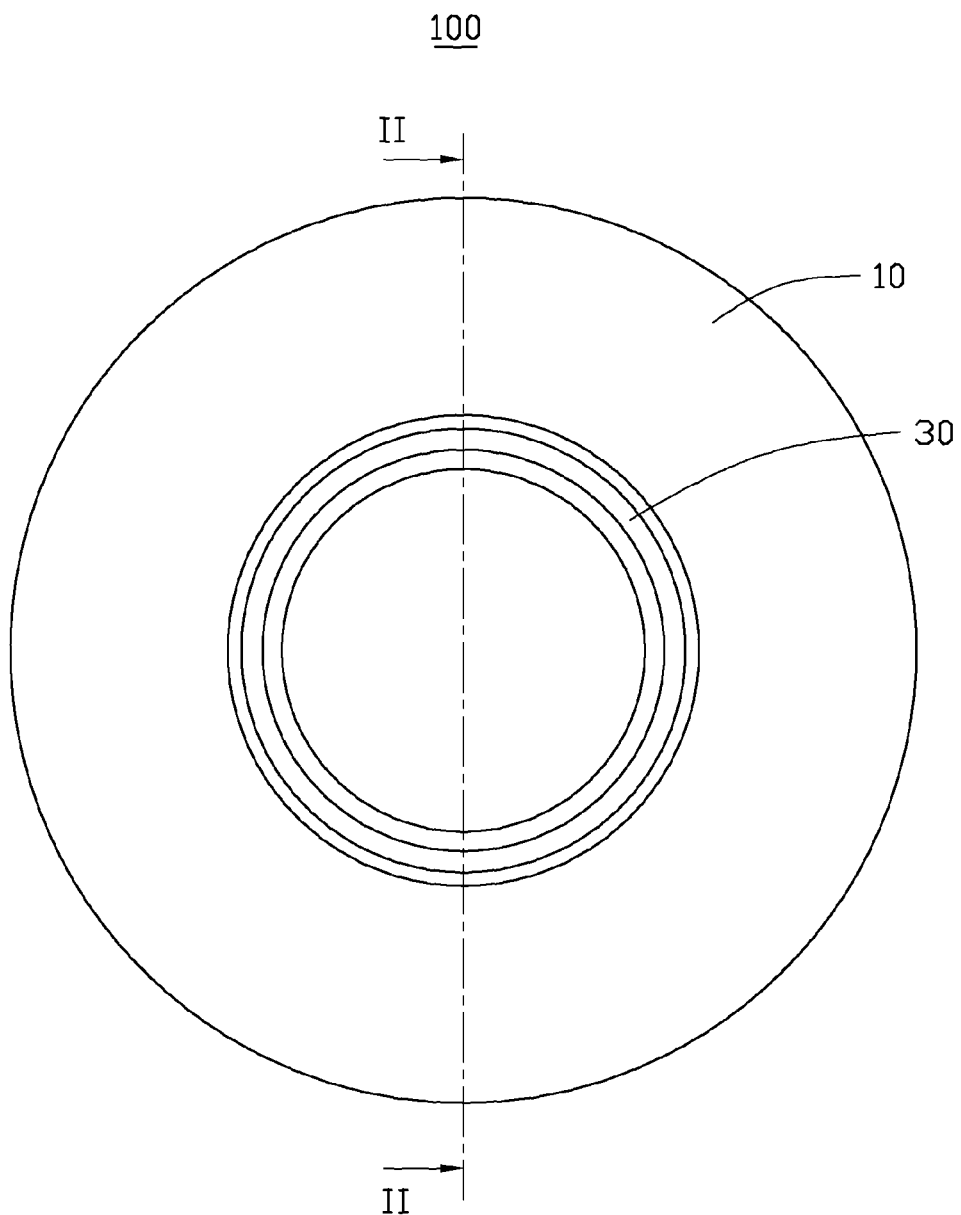
FIG. 1 is a front view of a first embodiment of a wheel including a tire.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a wheel. The wheel can include a tire, a rim, and two groups of supporting members. The tire can be coupled to the rim. Two groups of supporting members are received in the tire and positioned on opposite sidewalls of the tire. The supporting members of each group can be separately coupled to the tire by injection molding. Each supporting member is substantially annular. Central axes of the supporting members of each group of supporting members can be coincident or parallel.

FIG. 1 illustrates a first embodiment of a wheel 100. The wheel 100 can include a tire 10 and a rim 30. The tire 10 can be coupled to the rim 30. In at least one embodiment, the tire 10 can be a tubeless tire.

Figure 2:
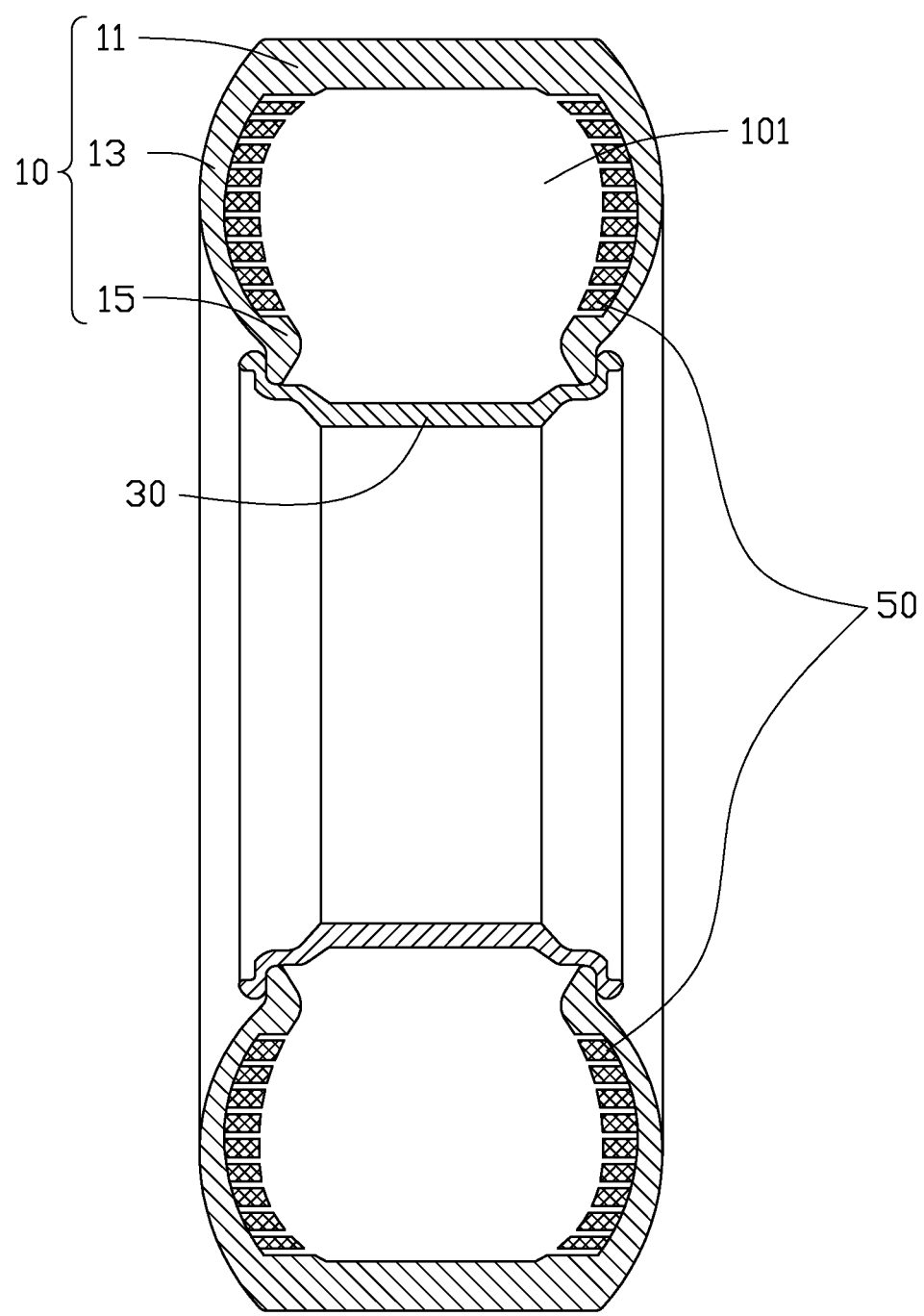
FIG. 2 is a cross-sectional view of the wheel of FIG. 1, taken along line II-II.

FIG. 2 illustrates that the tire 10 can include a tread 11, two sidewalls 13, and two stretching portions 15. The sidewalls 13 can be positioned opposite to each other. The stretching portions 15 can be positioned opposite to each other. The tread 11 can be substantially annular and can be configured to keep contact with and roll on the ground while moving. Each of the sidewalls 13 can be substantially cambered and annular. One of the sidewalls 13 can arcuately protrude out from a first edge of the tread 11 toward a central axis of the tire 10. Another one of the sidewalls 13 can arcuately protrude out from a second edge of the tread 11 toward the central axis of the tire 10. Each stretching portion 15 can protrude out from an edge of the sidewall 13 away from the tread 11. The tread 11, the sidewalls 13, and the stretching portions 15 can cooperatively define a internal chamber 101. The rim 30 can be substantially annular. Each stretching portion 15 can be coupled to the rim 30.

The wheel 100 can further include two groups of supporting members 50 received within the tire 10. The two groups of supporting members 50 can be received in the internal chamber 101. One group of supporting members 50 can be coupled to an inner surface of one of the sidewalls 13 by injection molding. Another group of supporting members 50 can be coupled to an inner surface of another one of the sidewalls 13 by injection molding. Each group of supporting members 50 can include nine supporting members 50. Each supporting member 50 can be substantially annular. The supporting members 50 of each group can be separately and concentrically positioned (e.g., equidistant) from each other. A cross section of each supporting member 50 can be substantially rectangular. A central axis of each supporting member 50 can be coincident with a central axis of the sidewall 13. In at least one embodiment, the supporting members 50 and the tire 10 can be made from different rubber. In an alternative embodiment, the supporting members 50 and the tire 10 can be made from a same material. The material of the supporting members 50 can be chosen according to a desired supporting weight of the tire 10. In an alternative embodiment, the number of the supporting members 50 of each group can be two or more than two.

In manufacturing of the wheel 100, the tire 10 can be made by a molding method. The supporting members 50 can be formed on the inner surface of each sidewall 13 by injection molding. The tire 10 can be coupled to the rim 30.

Figure 3:
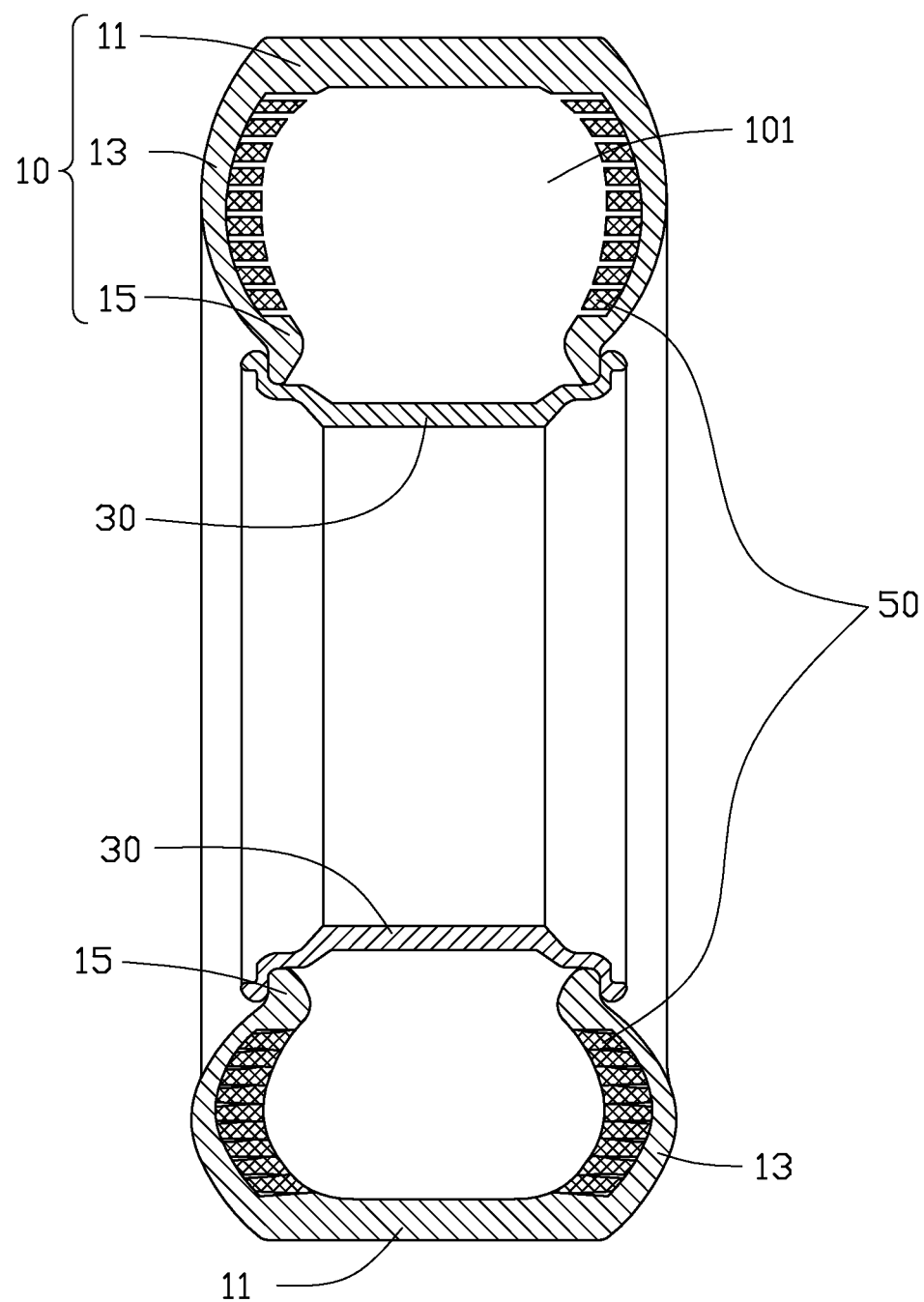
FIG. 3 is a cross-sectional view of the wheel of the FIG. 1, taken along line II-II, when the tire is deflated.

In use, when the wheel 100 is in normal use, the supporting members 50 can be separately positioned. When the tire 10 is punctured and deflated, the tire 10 can be compressed and the sidewalls 13 can be deformed. When the sidewalls 13 are deformed, ends of the supporting members 50 can provide a supporting force by abutting each other (shown in FIG. 3), to support the tire 10.

Figure 4:
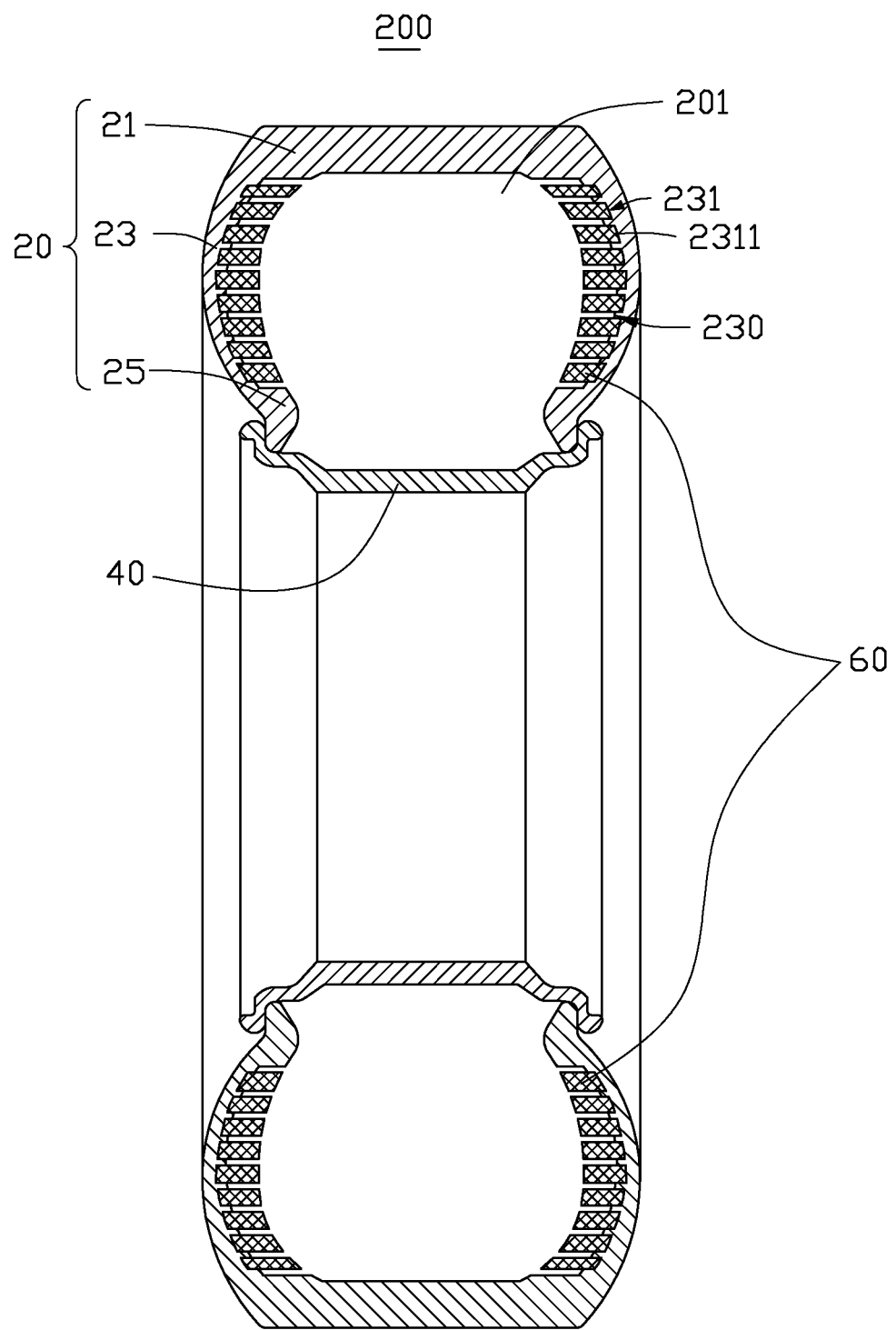
FIG. 4 is a cross-sectional view of a second embodiment of a wheel.

FIG. 4 illustrates a second embodiment of a wheel 200. The wheel 200 can include a tire 20, a rim 40, and two groups of supporting members 60. The tire 20 can be coupled to the rim 40. The supporting members 60 can be received within the tire 20. In at least one embodiment, the tire 20 can be a tubeless tire.

The tire 20 can include a tread 21, two sidewalls 23, and two stretching portions 25. The sidewalls 23 can be positioned opposite to each other. The stretching portions 25 can be positioned opposite to each other. The tread 21 can be substantially annular and can be configured to keep contact with and roll on the ground while moving. Each of the sidewalls 23 can be substantially cambered and annular. One of the sidewalls 23 can arcuately protrude out from a first edge of the tread 21 toward a central axis of the tire 20. Another one of the sidewalls 23 can arcuately protrude out from a second edge of the tread 21 toward the central axis of the tire 20. Each stretching portion 25 can protrude out from an edge of the sidewall 23 away from the tread 21. The tread 21, the sidewalls 23, and the stretching portions 25 can cooperatively define a internal chamber 201. An inner surface 230 of each sidewall 23 can define a plurality of grooves 231 along a circumferential direction of the sidewall 23. Each of the grooves 231 can be substantially annular. The grooves 231 can be separately and concentrically positioned relative to each other. Each groove 231 can include an annular surface 2311. The rim 40 can be substantially annular. Each stretching portion 25 can be coupled to the rim 40.

The two groups of supporting members 60 can be received in the internal chamber 201. One group of supporting members 60 can be coupled to the inner surface 230 of one of the sidewalls 23 by injection molding. Another group of supporting members 60 can be coupled to the inner surface 230 of another one of the sidewalls 23 by injection molding. Each group of supporting members 60 can include nine supporting members 60. Each supporting member 60 can be substantially annular. The supporting members 60 of each group can be separately and concentrically positioned from each other. A cross section of each supporting member 60 can be substantially rectangular. A central axis of each supporting member 60 can be coincident with a central axis of the sidewall 23. A first end of each supporting member 60 can be received in the groove 231. A second end of each supporting member 60 can protrude along a radial direction of the grooves 231. The second end of each supporting member 60 can be higher than the groove 231. The supporting members 60 and the tire 20 can be made from different rubber. In an alternative embodiment, the supporting members 60 and the tire 20 can be made from a same material. The material of the supporting members 60 can be chosen according to a desired supporting weight of the tire 20. In an alternative embodiment, the number of the supporting members 60 of each group can be two or more than two.

In manufacturing of the wheel 200, the tire 20 can be made by a molding method. The supporting members 60 can be formed on the annular surface 231 by injection molding. The tire 20 can be coupled to the rim 40.

In an alternative embodiment, the cross section of the supporting member 50 and the supporting member 60 are not rectangular, the cross section can be any other shape, only assuring that the wheel 100 is rotating normally when the supporting members 50 of each group or the supporting members 60 of each group of the supporting members 60 are separately positioned from each other.

Figure 5:
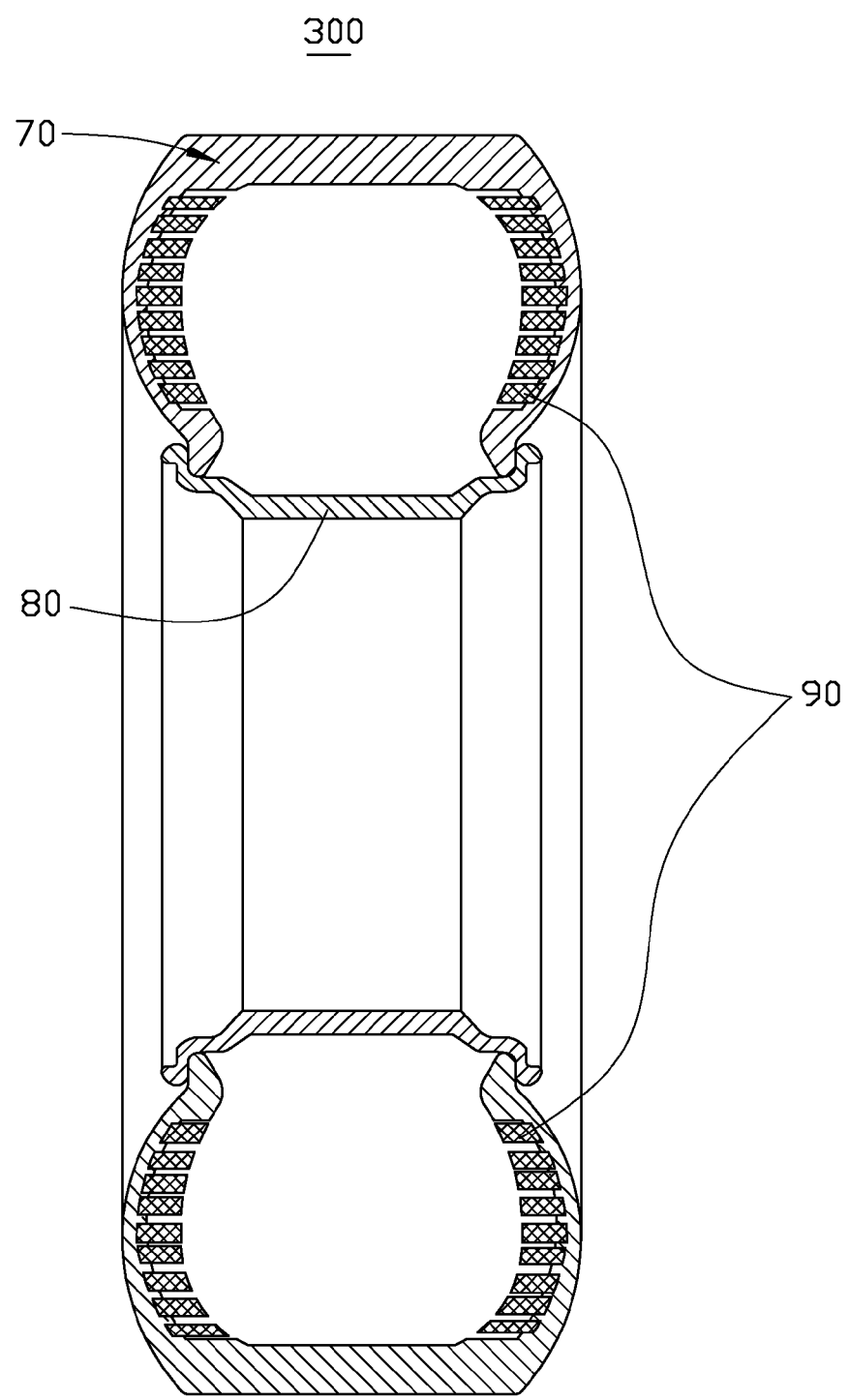
FIG. 5 is a cross-sectional view of a third embodiment of a wheel.

FIG. 5 illustrates a third embodiment of a wheel 300. The wheel 300 can include a tire 70, a rim 80, and two groups of supporting members 90. Each group of supporting members 90 can include nine supporting members 90. The supporting members 90 of each group are not equidistant from each other. A central axis of each supporting member 90 can be parallel to a central axis of the wheel 300 or can be coincident with a central axis of the wheel 300, the supporting members 90 of each group can be separately positioned from each other when the wheel 300 is in normal use.

In an alternative embodiment, when the supporting members 50 are concentrically positioned from each other, the central axis of each supporting member 50 is not coincident with a central axis of the sidewall 13. The central axis of each supporting member 50 is parallel to the central of the sidewall 13.

It is believed that the present embodiments and their advantages will be understood from the foregoing description, and it will be apparent that various changes can be made thereto without departing from the spirit and scope of the embodiments or sacrificing all of its material advantages.

What is claimed is:

1. A wheel comprising:
    a rim;
    a tire mounted on the rim, having a tread and two sidewalls, and defining an internal chamber;
    two groups of supporting members mounted within the internal chamber on the two sidewalls, respectively;
    wherein when the tire is inflated, the support members of each of the two groups are spaced apart;
    wherein when the tire is deflated, the bottom of the tire collapses such that the support members of each of the two groups at the bottom of the tire abut each other to create a collective vertical support for the tire; and
    wherein one group of supporting members are concentrically and separately coupled to an inner surface of one of the sidewalls, another group of supporting members are concentrically and separately coupled to an inner surface of another one of the sidewalls; and the inner surface of each of the sidewalls defines a plurality of grooves along a circumferential direction of the sidewall and separately positioned relative to each other.

2. The wheel of claim 1, wherein the tire further comprises two stretching portions opposite to each other, each stretching portion protrudes out from an edge of the sidewall away from the tread, each stretching portion is coupled to the rim.

3. The wheel of claim 1, wherein the groups of supporting members and the tire are made from a same material.

4. The wheel of claim 1, wherein the groups of supporting members and the tire are made from different materials.

5. The wheel of claim 1, wherein the wheel is a tubeless tire.

6. A wheel comprising:
    a tire;
    an tread;
    two sidewalls oppositely positioned at two opposite sides of the tread;
    a rim coupled to the tire; and
    two groups of supporting members oppositely positioned and received in the tire; wherein the supporting members of each group are separately coupled to the tire, each supporting member is substantially annular, and central axes of the supporting members of each group are coincident or parallel;
    wherein an inner surface of each of the sidewalls defines a plurality of grooves along a circumferential direction of the sidewall and separately positioned from each other, a first end of the supporting member is received in the groove.

7. The wheel of claim 6, wherein the tire further comprises two stretching portions opposite to each other, each stretching portion protrudes out from an edge of the sidewall away from the tread, each stretching portions is coupled to the rim.

8. The wheel of claim 7, wherein the tread, the sidewalls portions, and the stretching portions define a internal chamber, cooperatively, the groups of supporting members are received in the internal chamber.

9. The wheel of claim 6, wherein the groups of supporting members and the tire are made from a same material.

10. The wheel of claim 6, wherein the groups of supporting members and the tire are made from different materials.

11. The wheel of claim 6, wherein the wheel is a tubeless tire.

* * * * *